(12) United States Patent
Mishra et al.

(10) Patent No.: US 10,899,084 B2
(45) Date of Patent: Jan. 26, 2021

(54) METHODS FOR FORMING COMPOSITE STRUCTURES

(71) Applicant: Bell Helicopter Textron Inc., Fort Worth, TX (US)

(72) Inventors: Suvankar Mishra, Carrollton, TX (US); Jesse J. Wrabel, Ft. Worth, TX (US); Vance N. Cribb, III, Aledo, TX (US)

(73) Assignee: TEXTRON INNOVATIONS, INC., Fort Worth, TX (US)

( * ) Notice: Subject to any disclaimer, the term of this patent is extended or adjusted under 35 U.S.C. 154(b) by 281 days.

(21) Appl. No.: 16/036,228

(22) Filed: Jul. 16, 2018

(65) Prior Publication Data

US 2020/0016880 A1 Jan. 16, 2020

(51) Int. Cl.
| | | |
|---|---|---|
| *B29C 65/00* | (2006.01) | |
| *B32B 37/10* | (2006.01) | |
| *B32B 37/06* | (2006.01) | |
| *B32B 38/10* | (2006.01) | |
| *B32B 43/00* | (2006.01) | |
| *B32B 37/00* | (2006.01) | |

(52) U.S. Cl.
CPC .... *B29C 66/02242* (2013.01); *B32B 37/0053* (2013.01); *B32B 37/06* (2013.01); *B32B 37/1018* (2013.01); *B32B 38/10* (2013.01); *B32B 43/00* (2013.01); *B32B 2305/77* (2013.01); *B32B 2605/18* (2013.01)

(58) Field of Classification Search
CPC .......... B29C 2793/0045; B29C 70/545; B29C 70/546; B29C 70/547; B29C 66/02242
See application file for complete search history.

(56) References Cited

U.S. PATENT DOCUMENTS

| | | | |
|---|---|---|---|
| 2004/0051214 A1* | 3/2004 | Sheu | B29C 70/443 264/511 |
| 2010/0098906 A1* | 4/2010 | Bongiovanni | B29C 37/0064 428/138 |

* cited by examiner

*Primary Examiner* — Christopher T Schatz
(74) *Attorney, Agent, or Firm* — Patent Capital Group (57) ABSTRACT

A method is provided in one example embodiment and may include forming a ply stack comprising a plurality of uncured composite plies, wherein one or more uncured composite ply of the plurality of uncured composite plies comprises a plurality of perforations that extend, at least partially, through a thickness of the one or more uncured composite ply; and compacting the ply stack to form a composite structure. The plurality of perforations may provide paths for volatiles to be removed through the thickness of the one or more uncured composite ply of the ply stack during the compacting. Volatiles may also be removed through edges of the ply stack during the compacting. In some instances, all uncured composite plies of the ply stack may include a plurality of perforations that extend, at least partially, through the thickness of each uncured composite ply.

19 Claims, 8 Drawing Sheets

METHODS FOR FORMING COMPOSITE STRUCTURES

TECHNICAL FIELD

This disclosure relates in general to the field of aircraft and, more particularly, though not exclusively, to methods for forming composite structures.

BACKGROUND

Aircraft can include many components that can be constructed using composite materials. A composite material may be a combination of different materials integrated together to achieve certain structural properties and/or designs. It may be challenging, however, to manufacture aircraft components using composite materials in a cost and/or time efficient manner.

SUMMARY

According to one aspect of the present disclosure, a method may be provided and may include forming a ply stack comprising a plurality of uncured composite plies, wherein one or more uncured composite ply of the plurality of uncured composite plies comprises a plurality of perforations that extend, at least partially, through a thickness of the one or more uncured composite ply; and compacting the ply stack to form a composite structure. Compacting the ply stack may further include encapsulating the ply stack within a bag; and increasing a vacuum level within the bag to increase external pressure on the bag and the composite structure. The plurality of perforations may provide paths for volatiles to be removed through the thickness of the one or more uncured composite ply of the ply stack during the compacting. Volatiles may also be removed through edges of the ply stack during the compacting. In some instances, all uncured composite plies of the ply stack may include a plurality of perforations that extend, at least partially, through the thickness of each uncured composite ply.

In various instances, the plurality of perforations may be provided for one or more areas of the one or more uncured ply of the plurality of uncured composite plies, and the one or more areas may correspond to one or more of: one or more curved portions of the composite structure; one or more angled portions of the composite structure; and one or more corner portions of the composite structure. In some instances, the plurality of perforations may be provided for an overall area of at least one uncured composite ply of the plurality of uncured composite plies. In still some instances, the plurality of perforations for at least one uncured composite ply may extend completely through the thickness of the least one uncured composite ply. In still some instances, at least one perforation of the plurality of perforations for a particular uncured composite ply may intersect at least one evacuation channel for the particular uncured composite ply. In some cases, the ply stack may include at least 14 uncured composite plies.

In some cases, compacting the ply stack may further include: providing a bleeder material along sides of the ply stack, wherein the bleeder material extends laterally away from the sides of the ply stack; providing a perforated release film over the ply stack, wherein the perforated release film extends laterally away from the sides of the ply stack; providing a breather material over the perforated release film, wherein the breather material extends laterally away from the sides of the ply stack, and the release film is between at least a portion of the breather material and the bleeder material; encapsulating the ply stack, the bleeder material, the perforated release film, and the breather material within a bag; and increasing a vacuum level within the bag to increase external pressure on the bag and the composite structure. In still some cases, compacting the ply stack may further include providing roving material between the bleeder material and at least one side of the ply stack. In some cases, the compacting can be performed at room temperature. In still some cases, the compacting can be performed at one or more elevated temperatures following the room temperature compacting. In some cases, the method can include curing the composite structure.

In some instances, forming the ply stack may further include: forming the plurality of perforations for the one or more uncured composite ply of the plurality of uncured composite plies; and assembling the one or more uncured composite ply on a tool to form the ply stack after the plurality of perforations are formed for the one or more uncured composite ply. In some cases, perforations may be formed for a side of the one or more uncured composite ply that has a backing layer. In still some cases, forming the ply stack may further include: assembling one or more uncured composite ply on a tool to form the ply stack; and forming perforations for the one or more assembled uncured composite plies on the tool. In some instances, one or more additional uncured composite plies that do not have a plurality of perforations, may be assembled on the ply stack. In some instances, a plurality of perforations may be formed for the one or more additional assembled uncured composite plies on the tool.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as 'above', 'below', 'upper', 'lower', 'top', 'bottom', or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature) of an element, operations, and/or conditions, the phrase 'between X and Y' represents a range that includes X and Y.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Figure 1A:
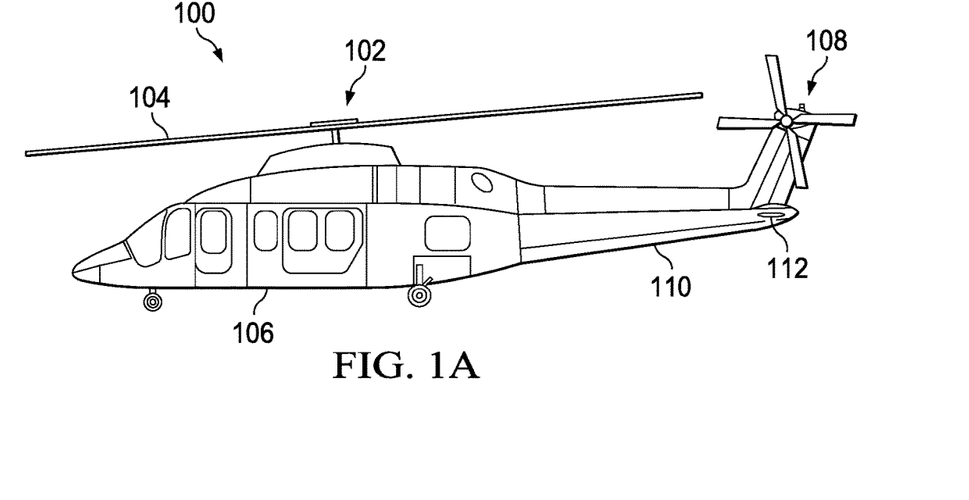
FIGS. 1A-1B are simplified schematic diagrams of an example aircraft, in accordance with certain embodiments.
Figure 1B:
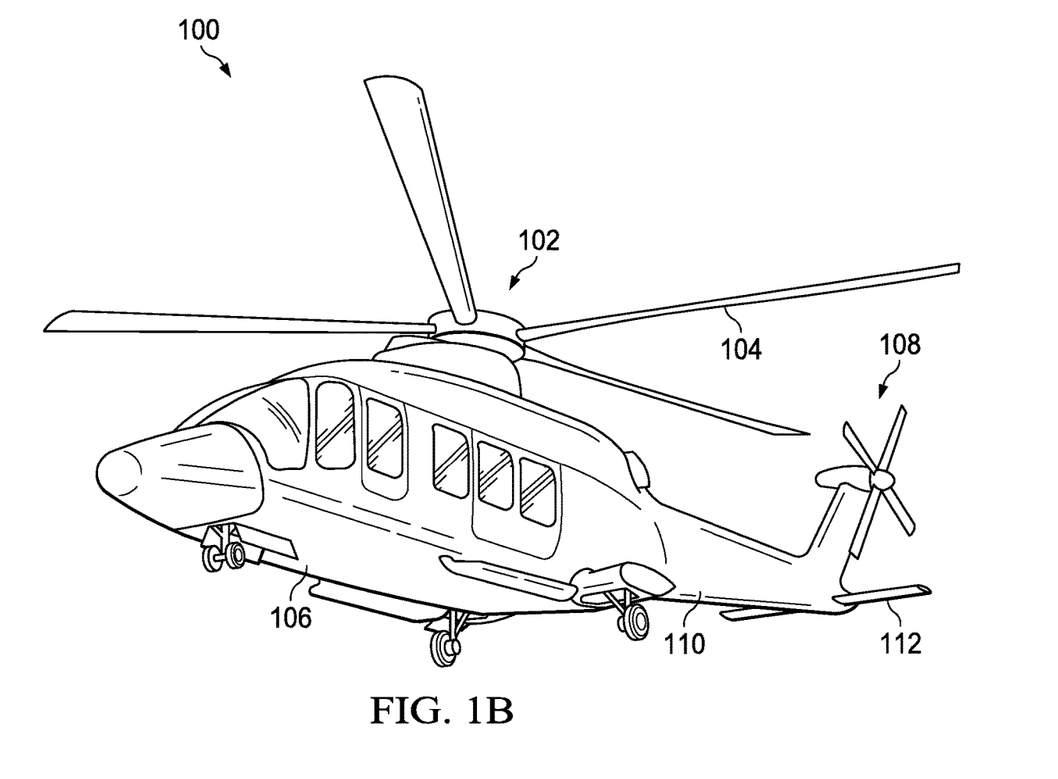

FIGS. 1A-1B illustrate an example embodiment of an example aircraft, which in this example is a rotorcraft 100. FIG. 1A portrays a side view of rotorcraft 100, while FIG. 1B portrays an isometric view of rotorcraft 100. Rotorcraft 100 includes a rotor system 102 with a plurality of rotor blades 104. The pitch of each rotor blade 104 can be managed or adjusted in order to selectively control direction, thrust, and lift of rotorcraft 100. Rotorcraft 100 further includes a fuselage 106, a tail rotor or anti-torque system 108, an empennage 110, and a tail structure 112. The fuselage 106 is the main body of the rotorcraft, which may include a cabin (e.g., for crew, passengers, and/or cargo) and/or may house certain mechanical and electrical components (e.g., engine(s), transmission, and/or flight controls). In the illustrated embodiment, tail structure 112 may be used as a horizontal stabilizer. Torque is supplied to rotor system 102 and anti-torque system 108 using at least one engine and at least one gearbox.

In some cases, various components of rotorcraft 100 may be made from composite materials. A composite material is a combination of different materials integrated together to achieve certain structural and/or design properties. Stated differently, a composite material may be a combination of at least two different materials that, when they are in close proximity and function in combination with each other, enhance the capabilities that either material may possess alone. Composite materials can be integrated together to form three-dimensional composite structures. The properties of a three-dimensional composite structure are typically superior to the properties of the underlying materials individually. For example, certain composite materials may be lightweight yet relatively strong, rendering them particularly suitable for aircraft and other applications where weight and/or strength are critical to performance.

Many components of rotorcraft and other aircraft can be designed using composite materials including, but not limited to, flight control surfaces (sometimes referred to as 'skins'), wings, fairings, spoilers, stabilizers, propellers, rotor blades, rotor yokes, engine blades, engine components, airframe structural components, spars, tubes, the fuselage, various interior components (e.g., floors, walls, interior fixtures), and so forth. As referred to herein in this Specification, the term 'composite structure' may include any part, element, component, device, etc. that may be formed (e.g., manufactured, fabricated, etc.) using multiple layers of composite materials. Layers of composite materials used in forming a composite structure are often referred to as plies or laminates, which can be configured (e.g., by hand or using a placement machine) into a ply or laminate stack and further processed to form the composite structure, as discussed for various embodiments described herein. As referred to herein, the terms 'making', 'forming', 'fabricating', and 'manufacturing' may be used interchangeably in reference to making a composite structure.

In some cases, composite materials that may be used in forming composite structures in accordance with embodiments described herein can be fiber reinforced composite materials. In general, a fiber reinforced composite material may be any composite that includes a fiber that is a basic load carrying member of a composite and a matrix (e.g., a resin, adhesive, etc.) that holds the composite together so that energy can be transferred among the fibers for the composite. Fibers for reinforced composite materials can include woven fabrics, unidirectional fibers, multidirectional fibers, and/or any combination thereof, which may or may not be implemented as one or more sheets of fibers for a composite material. In some instances, fibers for a reinforced composite material can be referred to as a 'fiber system'. Examples of various fibers or fiber systems that may be included in a composite material that may be used in forming composite structures in accordance with embodiments described herein can include but not be limited to, carbon, boron, Kevlar®, glass (e.g., fiberglass), basalt, Dyneema®, metals (coated or uncoated), metal alloys (coated or uncoated), metal coated fibers, combinations thereof, or the like.

A fiber system for a composite material can be disposed in an uncured resin or adhesive system (which may be collectively referred to herein as a 'resin system'), which may be in the form of a pre-impregnated (typically referred to using the term 'prepreg') composite material. Examples of a resin system that may be included in a composite material that may be used in forming composite structures in accordance with embodiments described herein can include, but not be limited to, a thermoset system such as polyester, plastic (e.g., bismaleide (BMI) plastic), and/or an epoxy material; or a thermoplastic system (e.g., polyetheretherketone (PEEK), Polyetherkeytonekeytone (PEKK), Polyetherimide (PEI), etc.), or the like.

Various fiber reinforced composite materials that may be used in forming composite structures in accordance with embodiments described herein may include carbon fiber reinforced polymer (CFRP), HexPly 8552 made by Hexcel®, carbon fiber fabric prepreg plies (e.g., 3K carbon fiber fabric with either a Hexcel® F593, Ciba Geigy R922, Ciba Geigy R6376, Ciba Geigy M20, or thermoplastic resin system), boron fiber prepreg plies, fiberglass prepreg plies, or the like.

Uncured composite prepreg plies typically have air entrained in them. When forming composite structures, multiple layers prepreg plies are often assembled into a ply stack for a given configuration (e.g., via a molding tool or the like) and volatiles (e.g., air, trapped gasses, liquid and/or gaseous resin volatiles, etc.) that may exist within and/or between the assembled plies are removed from the plies to 'debulk' and compact the plies. Debulking of uncured composite prepreg plies can be performed using externally-applied mechanical pressure and human effort. Traditionally, vacuum systems or hydraulic equipment can be used to debulk uncured composite prepreg plies (typically at room temperature) over an extended period of time. In some cases, heat may additionally be applied to an in-process composite structure that is under elevated pressure using a 'hot debulk' or 'hot compaction' processing cycle (or cycles) to remove additional bulk from the in-process composite structure that may not be removed by pressure alone and/or to ensure a proper fit in a molding tool. As referred to herein in this Specification, the term 'in-process composite structure' may refer to an unfinished composite structure that is in the process of being fabricated into a final composite structure.

Hot compactions are typically performed using an oven or autoclave. For example, an autoclave can be used to apply both an elevated autoclave pressure and an elevated heat to an in-process composite structure. During a hot compaction, heat can decrease viscosity of the resin system of an uncured composite prepreg ply, which allows the resin to flow better and allow volatiles (e.g., any trapped gasses, etc.) to escape. As referred to herein in this Specification, the terms 'debulk' and 'compaction', and variations thereof, may be referred to collectively using the term 'debulk/compact' (and variations thereof) or using each term alone in reference to debulking and/or compacting composite plies (with or without heat) to form a composite structure.

Removing volatiles from uncured composite prepreg plies through debulking/compaction processes can help to reduce defects such as voids, wrinkles (sometimes referred to as 'marcels'), and/or porosity for cured composite structures. Such defects can decrease the strength and/or stiffness of composite structures, which can result in low quality composite structures.

Resin systems for composite plies can be impregnated into fiber systems of the plies using different techniques depending on the type of processing (e.g., autoclave processing or out-of-autoclave processing) that is intended for the plies. For example, an uncured composite prepreg ply that is intended for autoclave processing is typically fully impregnated, meaning that the fiber system of the uncured ply is fully impregnated by the resin system. In contrast, an uncured composite prepreg ply that are intended for out-of-autoclave processing (e.g., using vacuum systems to apply pressure and/or ovens to apply heat) may be impregnated to a predetermined depth based on the overall thickness of the fiber system of the ply along the horizontal area of one or both sides of the fiber system; thereby forming a partially impregnated ply. In some cases, a resin system of partially impregnated plies may be applied over the entire horizontal area of one or both sides of a ply; however, in other cases, a resin system be selectively applied over specific portions of the horizontal area of one or both sides of the ply. By partially impregnating a ply along a horizontal area of one or both sides of the ply, lateral evacuation channel(s) may be formed such that when plies are stacked on top of each other in ply stack, the evacuation channel(s) provide path(s) for volatiles to escape the ply stack along the edge sides of the ply stack and into a bleeder material (typically referred to as 'edge bleeding') while the ply stack is under vacuum.

For currently available uncured composite partially impregnated plies (also referred to herein as 'out-of-autoclave plies'), conventional debulking/compaction processes may be performed on in-process composite structures by applying vacuum pressure(s) at room temperature alone; however, these in-process composite structures typically have to be under vacuum for long periods of time (e.g., between 12-16 hours, overnight, etc.) before the application of elevated temperatures may be used for further debulking/compaction. Further, conventional debulking/compaction processes used for currently available uncured composite partially impregnated plies typically only involve edge bleeding to remove volatiles via the lateral evacuation channels of the plies, which contributes to the long periods of time for the processing.

Thus, while room temperature debulking/compaction processes performed using currently available uncured composite partially impregnated plies are useful in fabricating composite structures, performing such compactions can be a time consuming process, which can increase the overall cost for forming such structures. Further, conventional debulking/compaction processes used with uncured composite partially impregnated plies can lead to significant porosity in manufactured composite structures, which can reduce the quality (e.g., lower the strength, rigidity, etc.) of composite structures; thereby, leading to significant 'scrapping' (e.g., throwing away) of composite structures that fail to meet certifications, standards, etc. for use as aircraft components. Scrapping of such low quality composite structures due to porosity defects can further increase production time and costs.

In addition, conventional room temperature debulking/compaction processes performed for currently available uncured composite partially impregnated plies are typically limited to ply stacks having only 5 plies. Thus, for composite structures that are formed using more than 5 plies, multiple debulks/compactions of multiple ply stacks are typically needed to manufacture such composite structures. Performing multiple debulks/compactions for multiple ply stacks of an in-process composite structure can involve additional human effort and time, which can further increase the overall cost for forming composite structures having more than 5 plies. In addition, although the application of heat through hot compaction process(es) (e.g., for one or more ply stack(s)) may be useful for forming composite structures, the use of heat leads to additional process step(s), that can further increase the overall manufacturing time and cost for composite structures. Thus, it may be challenging to manufacture composite structures using composite materials in a cost and/or time efficient manner.

The present disclosure describes various embodiments that include methods for forming composite structures using stack(s) of uncured composite plies, wherein at least one ply of the ply stack is at least partially perforated for one or more area(s), which can reduce debulking/compaction time for forming composite structures as well as reduce porosity in the composite structures; thereby, providing for the ability to manufacture high quality composite structures (e.g., having high strength, rigidity, etc.) in a reduced amount of time as compared to composite structures manufactured using plies that do not have such perforations.

In accordance with at least one embodiment, a method of forming a composite structure may include forming a ply stack on a tool (e.g., a mandrel, mold tool, etc.) in which the ply stack includes multiple uncured composite partially impregnated plies wherein at least one uncured composite ply includes multiple of perforations that extend, at least partially, through a thickness of the at least one ply and compacting the ply stack to form a composite structure. Any number of plies of a ply stack may be perforated in accordance with embodiments described herein. In some embodiments, the compacting may be performed at room temperature; however, in other embodiments, the compacting may be performed at one or more elevated temperature(s) following room temperature compacting. In at least one embodiment, the term 'room temperature' may refer to temperatures within a range of 70 degrees Fahrenheit±10 degrees Fahrenheit. In at least one embodiment, elevated temperature(s) may include any temperature(s) greater than 120 degrees Fahrenheit.

In accordance with embodiments discussed herein, compacting a ply stack may include using a vacuum system to evacuate volatiles from plies of the ply stack using both 'through-the-thickness' evacuation and edge bleeding evacuation. As referred to herein in this Specification, the term 'through-the-thickness' evacuation may refer to vertically-based volatile evacuation that occurs via perforations provided for plies of a ply stack. Thus, embodiments of the present disclosure provide for the ability to evacuate volatiles from a ply stack both in a vertical direction using through-the-thickness breathing evacuation and a horizontal (lateral) direction using edge bleeding evacuation (e.g., via the horizontal evacuation channels of uncured composite plies).

In some embodiments, perforations for a ply may be provided using a 'needling tool', which may be a tool having tapered needles that are provided along a roller portion of the tool in which the tapered needles have a tapered diameter, pattern (spacing, etc.), and length. A needling tool may be rolled (e.g., by person(s) and/or machine(s)) across a ply that is laid out on a surface (which is typically rubber coated to receive the needles from the tool) to form perforations that extend at least partially through a thickness of the ply. Uncured composite partially impregnated plies that may be used in accordance with embodiments described herein may have any suitable thickness. For example, in some embodiments the plies may range in overall thickness between 0.006 inches and 0.010 inches, however, other thicknesses may be envisioned.

In still some embodiments, perforations for a ply may be provided using a needling machine that may include tapered needles provided over an area in which the needles have a tapered diameter, pattern (spacing, etc.), and length. The area in which the tapered needles are provided for the needling machine may be pressed (e.g., manually, automatically by the machine, etc.) into a ply at a suitable pressure in order to form perforations for the ply. As referred to herein in this Specification, the term 'needling' may be used in reference to forming perforations for a ply using a needling device (e.g., tool and/or machine), which may be performed either manually by hand, automatically by machine(s), and/or any combination thereof. Tapered needles for a needling device (e.g., tool and/or machine) that may be used in accordance with embodiments described herein may have any suitable dimensions. For example, in some embodiments, needles may have a tapered diameter ranging between 0.010 inches and 0.10 inches in which the puncturing ends of the needles may form a point to facilitate perforating plies. Other dimensions may be envisioned, however, needles having too large of a tapered diameter may cause holes that may not close during compaction, which may not help to reduce porosity. The length of needles may be varied depending on applications and/or implementations (e.g., needling one ply separately versus needling multiple plies together, or other variations).

In some embodiments, the pressure of such needling may be varied to effectuate different needling depths into the thickness of a ply. For example, in some embodiments hand pressure (e.g., between 2 pounds per square inch (psi) and 10 psi, or higher) used for needling may provide perforations that extend through an overall thickness of a ply. In some embodiments, lower needling pressures may be used for needling a ply in order to provide perforations that extend at least partially through the thickness of the ply (e.g., to a predetermined depth within the overall thickness of the ply). In some embodiments, however higher pressures may be used for perforating plies. For example, in some embodiments, multiple plies may be perforated together, which may utilize higher needling pressures. Thus, any suitable needling pressures may be utilized in accordance with embodiments described herein.

In some embodiments, perforations may be provided for an overall lateral area of each uncured composite ply; however, in other embodiments, perforations may be provided for one or more particular area(s) of one or more plies. In various embodiments, perforations may be provided in one or more particular area(s) of plies including, but not limited to, portions that may correspond to one or more radii or curves of a composite structure that is to be formed, portions that may correspond to one or more angles of a composite structure that is to be formed, portions that may correspond to one or more corners of a composite structure that is to be formed, combinations thereof, or the like for area(s) in which pressure alone may be insufficient to drive volatiles out of plies of a ply stack. Spacing of needles may be varied depending on applications and/or implementations. For example, in some embodiments, portions of a component that may be substantially flat may be needled with a larger X-Y needle spacing (e.g., for an X-Y coordinate system), while portions of a component that may be curved, that may have corners, that may be angled, etc. may be needled with a smaller X-Y needle spacing. However, in some embodiments, uniform X-Y needle spacing may be utilized. Thus, any suitable needle spacing may be utilized in accordance with embodiments described herein (e.g., between thousandths of an inch up to multiple inches, among others).

While providing perforations in one or more particular area(s) in which pressure alone may be insufficient to drive volatiles out of plies may be useful in some instances, such 'targeted' perforations may increase processing complexity and/or time in comparison to providing perforations for an overall lateral area of one or more uncured composite ply (e.g., more time may be needed to position a needling tool, machine, etc. at particular area(s) of a ply rather than providing perforations for the overall lateral area of the ply). Further, in some cases, the overall quality of a composite structure formed from plies having perforations provided in one or specific area(s) may be less than the overall quality of a composite structure formed from plies having perforations throughout their entirety (e.g., the overall porosity of a composite structure formed from plies having perforations provided throughout their entirety may be lower in comparison to a composite structure formed from plies having perforations provided only in one or more specific area(s)).

In some embodiments, perforations for a ply may be formed at an angle that is perpendicular to the lateral X-Y plane of the ply. In other embodiments, however, perforations for a ply may be formed at an angle that is less than 90 degrees and greater than 0 degrees in relation to the lateral X-Y plane of the ply.

In at least one embodiment, a vacuum system may include a sealing bag configured to encapsulate the ply stack and various foreign material layer(s) positioned along portions the ply stack and/or the tool. In various embodiments, foreign material layer(s) may include, but not be limited to, breather materials, caul plates, bleeder materials, release films, peel ply materials, sealing compounds, combinations thereof, or the like, as discussed in further detail herein. The sealing bag may be used to provide a sealed volume in which a vacuum can be drawn using a vacuum device (e.g., a vacuum pump) that may be coupled to the sealing bag using a port of the sealing bag or other appropriate coupling means.

Embodiments described throughout this disclosure may provide numerous technical advantages. Perforations provided for an uncured composite ply do not reduce the strength of the fiber system or the resin system of the uncured composite ply; thus, one advantage of embodiments described herein may include providing for the ability to form high quality (e.g., high strength, high rigidity, etc.) composite structures using one or more perforated out-of-autoclave plies and vacuum debulking/compaction systems in which the formed composite structures have reduced porosity in comparison to composite structures formed using non-perforated out-of-autoclave plies. Yet another advantage of embodiments described herein may include the ability to reduce debulking/compaction time using one or more perforated out-of-autoclave plies, which may reduce overall time and/or cost of manufacturing composite structures. Yet another advantage of embodiments described herein may include the ability to increase the ply count per debulking/compaction processing cycle using one or more perforated out-of-autoclave plies for ply stack(s), which may further reduce overall time and/or cost of manufacturing composite structures. Yet another advantage of embodiments described herein may include the ability to strategically provide perforations for one or more section(s) (e.g., curves, corners, etc.) of one or more plies used to form a composite structure where it may be challenging to apply intensifiers to create additional pressures.

Example embodiments associated with forming composite structures using one or more uncured composite partially impregnated plies (out-of-autoclave plies) that are at least partially perforated are described below with more particular reference to the remaining FIGURES. Although example embodiments discussed herein are described with reference to aircraft components, it should be appreciated that rotorcraft 100 of FIGS. 1A-1B is merely illustrative of a variety of aircraft in which composite structures may be used in accordance embodiments of the present disclosure. Other aircraft in which composite structures may be used can include, for example, fixed wing airplanes, hybrid aircraft, unmanned aircraft, gyrocopters, a variety of helicopter configurations, and drones, among other examples. Moreover, it should be appreciated that even though composite structures may be used in aircraft, composite structures as discussed for various embodiments described herein may also be used in a variety of industries including, but not limited to, aerospace, non-aircraft transportation (e.g., boats, automobiles, busses, etc.), railway transportation, consumer electronics, sporting equipment, and/or the any other type of composite structure.

Figure 2:
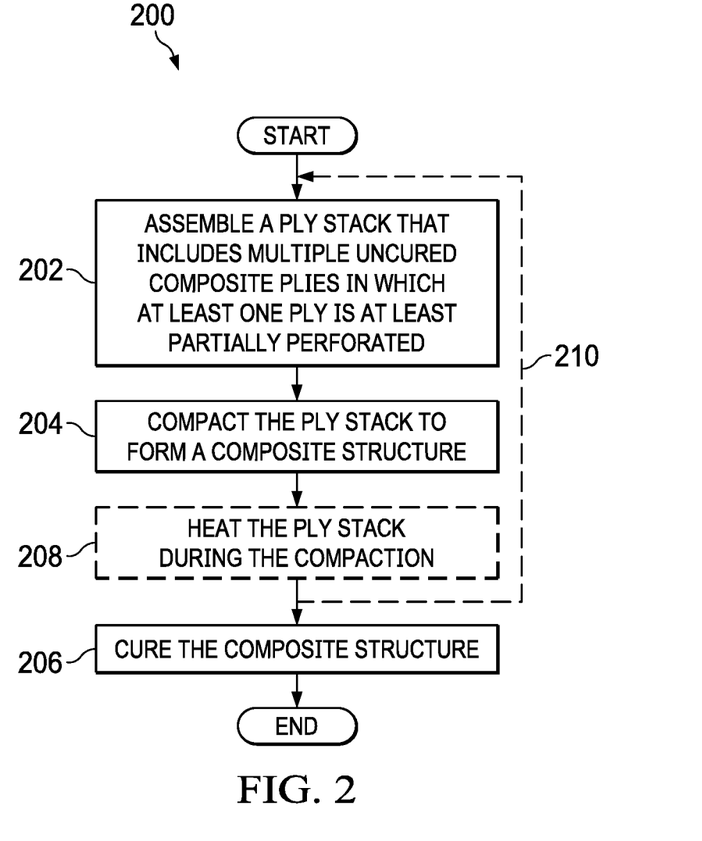
FIG. 2 is a simplified flowchart illustrating example details associated with forming a composite structure, in accordance with certain embodiments.

Referring to FIG. 2, FIG. 2 is a simplified flowchart 200 illustrating example details associated with forming a composite structure using one or more perforated plies, in accordance with certain embodiments. For the embodiment of FIG. 2, the composite structure may be formed in a cleanroom environment. In at least one embodiment, the flowchart may begin at block 202 by assembling, on a tool, a ply stack that includes multiple uncured composite plies in which at least one uncured composite ply of the ply stack is at least partially perforated. In at least one embodiment, the composite plies may be uncured composite partially impregnated plies (out-of-autoclave plies) having a resin system provided along one or both sides (e.g., top and/or bottom sides) of a fiber system of the plies. The composite plies may be composed of any materials as discussed herein. The composite plies may stacked on top of each other (e.g., by a human or by a placement machine) on the tool to form the ply stack.

At least one uncured composite ply of the ply stack may include perforations that extend at least partially through a thickness of each ply. In some embodiments, all composite plies of the ply stack may include perforations that extend at least partially through a thickness of each ply. Perforations may be made for the plies with a needling device (e.g., tool and/or machine) and may have any suitable size, spacing, depth, combinations thereof, or the like depending on various implementations and/or applications. Further, perforations may be made along any direction(s) of a ply or plies, may be made multiple times over a same area of a ply or plies, combinations thereof, or the like in accordance with embodiments of the present disclosure.

In some embodiments, one or more plies may be needled prior to assembling the plies on a tool; however, in other embodiments, one or more plies may be needled after assembling one or more plies on the tool. For example, in some embodiments prior to assembling a ply (that is to be needled) on the ply stack, the ply may be cut to a particular size (e.g., based on the composite structure that is being manufactured) and may be needled over one or more area(s) to form the perforations. However, in other embodiments, one or more plies may be assembled onto a tool and then perforated together at the same time. While needling plies together on a tool may be advantageous in some cases (e.g., potentially saving time by needling multiple plies at the same time), needling on a tool may cause damage to the tool and/or may result in composite structures having surfaces that may be degraded due to damage caused to a tool from needling on the tool. In some embodiments, perforations may be provided for an overall lateral area of a given ply that is to be needled; however, in other embodiments, the perforations may be provided for one or more particular area(s) of a given ply that is to be needled.

Plies may have a backing layer on one or both sides of the ply. In various embodiments, a backing layer may be a backing paper or polyethylene backing. Perforations for a given ply may be made from the side of the ply on which the backing layer is provided.

Consider an example in which one or more uncured composite plies for a ply stack may be perforated prior to assembly on a tool. In this example, consider that at least the first uncured composite ply has a backing layer on one side and is perforated using a needling device. In this example, the side through which perforations are provided may be laid-up against the tool following removal of the backing layer(s). For, any other subsequent ply that is to be perforated and assembled for the ply stack, the backing layer(s) of the ply is/are again removed and the side through which the perforations have been made may be laid-up against the previous ply laid for the ply stack. Non-perforated plies may be laid-up against a previous ply as may be conventionally performed. In some cases, air bubbles may be trapped between plies, in which cases, additional needling can be provided to puncture the bubbles to allow a more flush fit between plies. This example lay-up method is only one lay-up example and is not meant to limit the broad scope of the present disclosure. Virtually any other method for laying-up perforated plies for a ply stack may be envisioned and, thus, are clearly within the scope of the present disclosure. For example, if both sides of a ply that is to be perforated has a backing layer, either side may be placed against the tool or subsequent ply. In another example, one or more plies may be laid-up on a tool using conventional lay-up techniques and may be subsequently perforated on the tool.

In various embodiments, the tool may be a male mandrel, any male or female mold, or any other mold or combination of molds. In some embodiments, the tool may define a shape and/or other configuration of the composite structure that to be formed; however, in other embodiments the tool may not define a shape and/or other configuration of the composite structure that is to be formed (e.g., the composite structure may be machined following fabrication to form a different desired shape and/or configuration different than that provided by the tool).

When assembled on a tool, the ply stack may have a top side, a bottom side, and a number of edge sides (e.g., at the edges of the ply stack). In some embodiments, the bottom side of the ply stack may represent an outer surface of a composite structure that is to be formed; however, in other embodiments, the bottom side of the ply stack may represent the inner surface of a composite structure that is to be formed. In various embodiments, the top side of the ply stack may represent another outer surface of the composites structure that is to be formed, an inner surface of the composite structure that is to be formed, or may represent an intermediate surface upon which another ply stack may be formed (following debulking/compaction) to further fabricate the composite structure.

In some embodiments, an intermediate releasable material such as a peel ply, non-perforated release film, or the like may be positioned between a first ply of the ply stack and the tool. For example, the intermediate releasable material may be in direct contact with the tool on one side of the material and in direct contact with the first ply of the ply stack on an opposing side of the material such that the material may be 'sandwiched' between the ply stack and the tool. In some embodiments, an intermediate releasable material may be positioned along the top side of a ply stack in addition to or in lieu of positioning an intermediate material between the ply stack and the tool.

In some embodiments, an intermediate releasable material such as a peel ply that may be positioned along one or more surfaces of a composite structure may help to protect surfaces of the composite structure from contamination, defects, damage or other like during fabrication for an in process composite structure and/or during subsequent processes (e.g., transport, machining, etc.) of a cured composite structure.

The flowchart may proceed to block 204 by compacting the ply stack to form a composite structure. In at least one embodiment, compacting the ply stack may include using a vacuum system to evacuate gasses from the uncured plies of the ply stack. The vacuum system may include a sealing bag configured to encapsulate the ply stack and one or more foreign material layer(s) that may be placed or otherwise positioned along at least a portion of one or more side(s) of the ply stack. In at least one embodiment, the sealing bag may be made of nylon. In various embodiments, the foreign material layer(s) can be flexible and/or hard (stiff or semi-stiff) and may be any combination of: one or more release film(s), one or more breather material(s), one or more roving materials, one or more bleeder material(s), sealing compound(s), caul(s), or the like, which may aid and/or facilitate the evacuation of volatiles from the ply stack during debulking/compaction and/or aid and/or facilitate molding the ply stack to one or more shape(s). The sealing bag may be used provide a sealed volume in which a vacuum can be drawn on the ply stack using a vacuum device (e.g., a vacuum pump) that may be coupled to the sealing bag using a port of the sealing bag or other appropriate coupling means.

In general, a breather material may be a porous material such one or more sheets of Teflon®, polyester, or the like that may facilitate the evacuation of gaseous volatiles from a ply stack during debulking/compaction of the ply stack. In general, a bleeder material may be a porous material having wicking features, such as woven fiberglass, or the like that may facilitate the evacuation of liquid volatiles from a ply stack during debulking/compaction of the ply stack. In general, a roving material may be a porous material having wicking features, such as strands of woven fiberglass, or the like that may be placed between edges of a ply stack and bleeder material. Roving material is sometimes used when the edge of an in-process composite structure may be the final edge (sometimes referred to as Edge of Product (EOP)) of the composite structure that is to be formed (e.g., it may not to be subsequently cut to shape after curing). In general, a release film may be a synthetic film, such as plastic film or the like, which may be perforated or non-perforated and may aid in keeping separation between breather materials and a ply stack. In general, a peel ply may be a material such as nylon, porous glass, or the like that may be positioned between a release film and/or a tool and a ply stack that may be intended to remain affixed to a composite structure to protect the structure from damage, contamination, etc. until the structure is to be bonded or otherwise attached to another element, at which time, the peel ply may be removed from the structure. In general, caul plates or sheets of any size and/or shape, which can be stiff or semi-stiff, can be used to transmit pressure and help to provide a smooth surface for a composite structure. In general, sealing compound(s) can include any semi-malleable material that may have a tackiness that may enable to compound to stick to various materials (e.g., the sealing bag, bleeder materials, etc.) to form a seal between the sealing bag and the tool, to hold foreign material layers in place during debulking/compaction, combinations thereof, or the like.

In various embodiments, the sealed volume may be placed under a vacuum level of between one (1) inch to 28 inches of mercury to debulk and compact the ply stack. Increasing the vacuum level within the bag decreases pressure within the bag and results in increasing external pressure outside the bag; thereby creating a subsequent increase in pressure on the ply stack due to the differential pressure between ambient pressure outside the bag and the vacuum inside the bag. In some embodiments, multiple vacuum levels may be used during compaction of the ply stack.

In at least one embodiment, the compacting performed at 204 may be performed at room temperature. In some embodiments, the ply stack may additionally be heated (208) during the compacting (204), following room temperature compacting. For example, in some embodiments, the ply stack may be placed in an oven to heat (208) the ply stack to elevated temperature(s), which may increase the efficiency (e.g., decrease the debulking/compaction time) in removing volatiles from the ply stack. In at least one embodiment, the ply stack may be heated to temperature(s) greater than 85 degrees Fahrenheit.

The composite structure formed at 204 may be considered an in-process composite structure until the flowchart is completed. The compacting (204) and optional heating (208) may be maintained for a period of time that is sufficient to debulk and compact the ply stack to form the composite structure. In various embodiments, the period of time may range between 30 minutes and several hours or more, depending on various processing variables including, but not limited to, the beginning thickness of the ply stack (e.g., the number of uncured composite plies of the ply stack), the number of perforated uncured composite plies assembled for a ply stack, the materials of the uncured composite plies, the desired shape or configuration of the composite structure, among others.

In some embodiments, the assembling (202), the compacting (204), and optionally the heating (208) may be repeated (210) for embodiments in which multiple ply stacks may be used to form a composite structure. For embodiments in which the assembling (202), the compacting (204), and optionally the heating (208) may be repeated (210), the sealing bag and at least one foreign material layer(s) may be removed from the in process composite structure and tool prior to assembling (202) a subsequent stack of plies on the previously compacted ply stack and then subsequently re-encapsulating the stack with a sealing bag (e.g., a same or different sealing bag as used for a previous ply stack) in order to perform subsequent compactions for the in process composite structure.

Once the in-process composite structure is fabricated to a suitable number of plies (e.g., based on the design of the composite structure), the flowchart may proceed to block 206 by curing the in-process composite structure. In some embodiments, the curing (206) may include configuring the composite structure inside another tool or mold positioned along surface(s) of the in process composite structure. In various embodiments, the curing (206) may include curing the in-process composite structure at room temperature for additional period(s) of time, curing the in-process composite structure at elevated temperature(s) for additional period(s) of time, combinations thereof, or the like. In various embodiments, the period(s) of time for the curing (206) may range between 30 minutes and several hours or more. In at least one embodiment, the flowchart may be completed following the curing (206). In some embodiments, however, the flowchart may restart and/or certain blocks may be repeated.

Referring to FIGS. 3A-3I, FIGS. 3A-3I are simplified schematic diagrams illustrating example details that may be associated with forming a composite structure 390, in accordance with certain embodiments. For the embodiments of FIGS. 3A-3I, the composite structure 390 may be formed in a cleanroom environment.

Figure 3A:
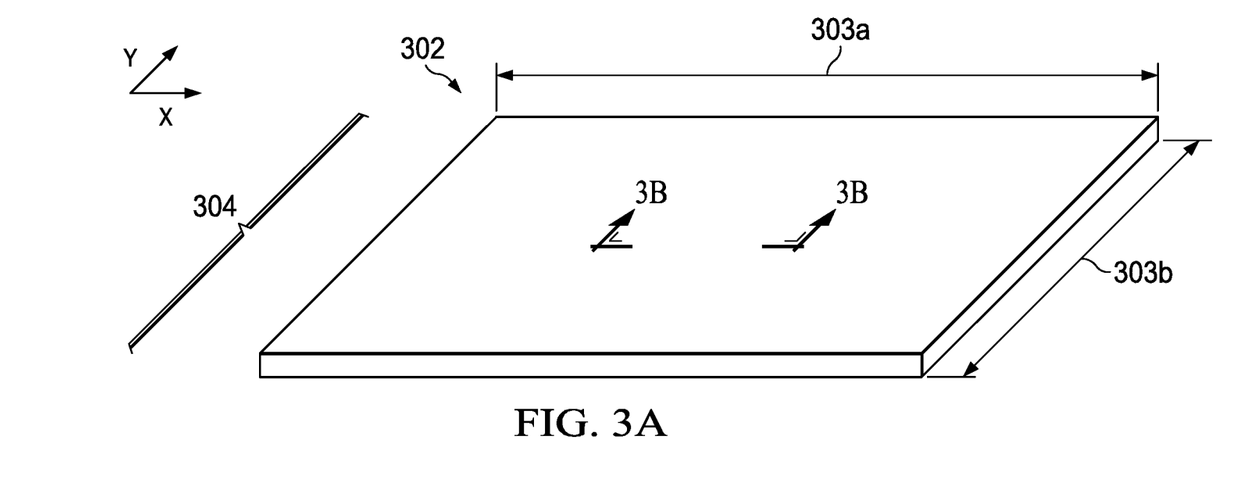
FIGS. 3A-3I are simplified schematic diagrams illustrating example details that may be associated with forming a composite structure, in accordance with certain embodiments.

Referring to FIG. 3A, an uncured composite ply 302 may be provided. The uncured composite ply 302 may be cut (e.g., by person(s) and/or machine(s)) to a desired shape based on the design of the composite structure that is to be formed. In some embodiments, uncured composite plies may be cut to the shape of a composite component that is to be formed; however, in other embodiments, uncured composite plies may be cut to a different shape and then may be subsequently cut after curing to form the shape of a composite component. Although the uncured composite ply 302 is illustrated as having a polygonal (e.g., square) shape, it is to be understood that plies discussed herein for the embodiments of FIGS. 3A-3I may be cut to any shape in accordance with embodiments of the present disclosure. Any X-Y coordinate system is illustrated in FIG. 3A in order to discuss various dimensions of uncured composite ply 302. The uncured composite ply 302 may have a lateral length 303a and a lateral width 303b, which may define an overall lateral X-Y area 304 for the uncured composite ply 302 (e.g., lateral length (X)×lateral width (Y)=lateral X-Y area). Other lateral areas for plies can be envisioned depending on shapes of plies.

Figure 3B:
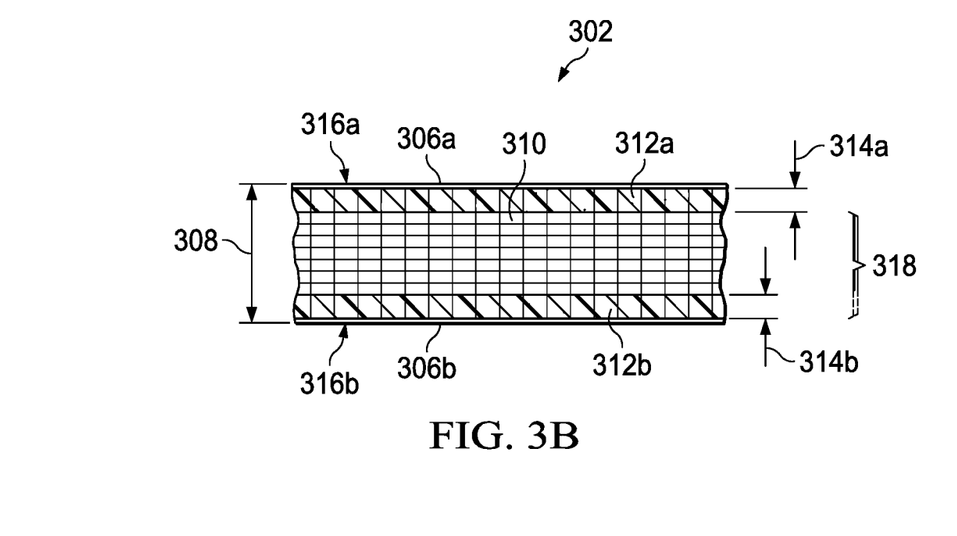

Referring to FIG. 3B, FIG. 3B is a simplified side, cross sectional view of the uncured composite ply 302 of FIG. 3A. The cross-section of FIG. 3B is cut along a line as generally indicated by the lines labeled '3B' in FIG. 3A. The uncured composite ply 302 (and other uncured composite plies 302 discussed for FIGS. 3F-3G, discussed below) may be an uncured composite partially impregnated ply in accordance with some embodiments; however, other types of plies (e.g., fully impregnated plies) may be used to form composite structures in accordance with embodiments described herein. For the embodiments of FIGS. 3A-3H, details related to uncured composite partially impregnated plies are described; however, this is not meant to limit the broad scope of the present disclosure. Virtually any types of plies may be used to form composite structures in accordance with embodiments described herein and, thus, are clearly within the scope of the present disclosure.

Referring again to FIG. 3B, the uncured composite ply 302 may have a first (top) side 306a and a second (bottom) side 306b, an overall thickness 308, and a fiber system 310 that is partially impregnated with a resin system 312, which may include a first resin system layer 312a that may be provided along the first side 306a to a first resin depth 314a and, optionally, a second resin system layer 312b that may be provided along the second side 304b to a second resin depth 314b. A first backing layer 316a may be provided for the first resin system layer 312a and, if the second resin system layer 312b is provided, a second backing layer 316b may be provided for the second resin system layer 312b.

The uncured composite ply 302 may include at least one evacuation channel(s) 318, which may include the non-impregnated (e.g., dry) portion of the fiber system 310 that may vertically extend between the first resin system layer 312a and the optional second resin system layer 312b or may extend between the first resin system layer 312a and the second side 306b of the uncured composite ply 302, depending on whether or not the the second resin system layer 312b and backing layer 316b are provided for the uncured composite ply 302. The evacuation channel(s) 318 may also extend across the lateral area of the uncured composite ply 302 to the edge sides of the ply. The height of the evacuation channel(s) 318 (not labeled) depends on the first resin depth 314a and/or the second resin system depth 314b (if provided).

The uncured composite ply (plies) 302 may have any suitable thickness 308 and the resin depths 314a, 314b may be provided at any suitable depths. The first resin depth and/or the second resin depth may be varied depending on whether one or both of the first and/or the second resin system layers are provided for a partially impregnated ply. For example, the first resin depth and the second resin depth may each have depth that is less than half of the overall thickness of a given partially impregnated ply for embodiments in which both the first and the second resin system layers are provided for the given partially impregnated ply. For embodiments in which only one resin system layer is provided over one side of a given partially impregnated ply, the resin system layer may have a depth that is less than the overall thickness of the given partially impregnated ply. For sake of brevity only, it is assumed that only the first resin system layer 312a and first backing layer 316a are provided for each uncured composite ply 302 for the embodiments of FIGS. 3C-3H, discussed below.

Figure 3C:
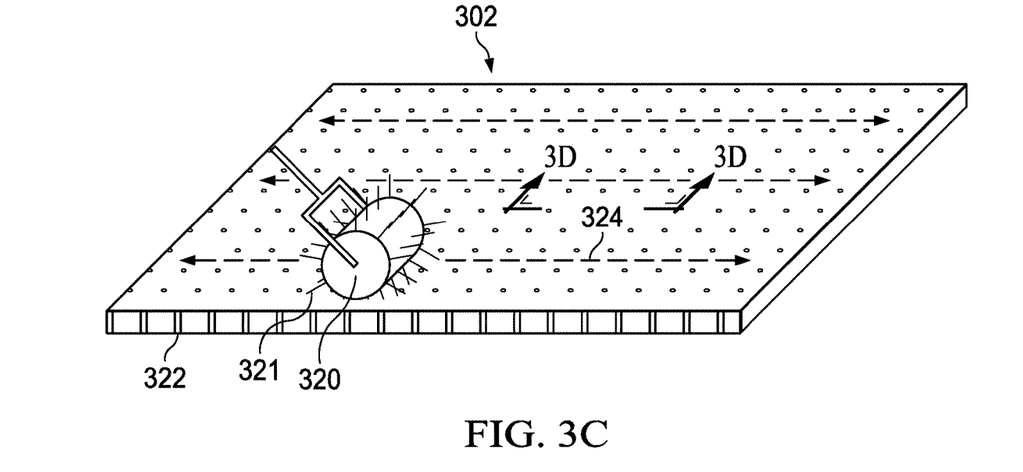

Referring to FIG. 3C, the uncured composite ply 302 may be perforated using a rolling-type needling device 320 with a number of tapered needles 321 to provide micro-sized perforations 322 for the uncured composite ply 302. The perforations may extend, at least partially, through the thickness 308 of the uncured composite ply 302. The perforations 322 may be provided using the rolling-type needling device 320, which for the embodiment of FIG. 3C may be a needling tool that may be rolled across (324) at least a portion of the lateral X-Y area 304 of the uncured composite ply 302. For the embodiment of FIG. 3C, uncured composite ply 302 may be perforated prior to assembly on a tool (e.g., it may be placed on a rubber covered surface, etc. to absorb the needling); however, it is to be understood that uncured composite plies may be perforated on or off a tool, in accordance with embodiments described herein.

In some embodiments, the perforations 322 may be provided for the overall lateral area 304 of the uncured composite ply 302; however, in other embodiments, the perforations 322 may be provided for one or more particular area(s) of the uncured composite ply 302 (e.g., portions that may correspond to one or more radii or curves of a composite structure that is to be formed, portions that may correspond to one or more angles of a composite structure that is to be formed, portions that may correspond to one or more corners of a composite structure that is to be formed, combinations thereof, or the like). Perforations 322 may be provided in any direction for uncured composite ply. In some embodiments, perforations can be provided for a same area for one or more directions across for the same area. For the embodiment of FIG. 3C, it can be assumed that the perforations 322 may be provided for the overall X-Y lateral area 304 of the uncured composite ply 302 and may have a size and spacing based on needles of the needling device 320.

Figure 3D:
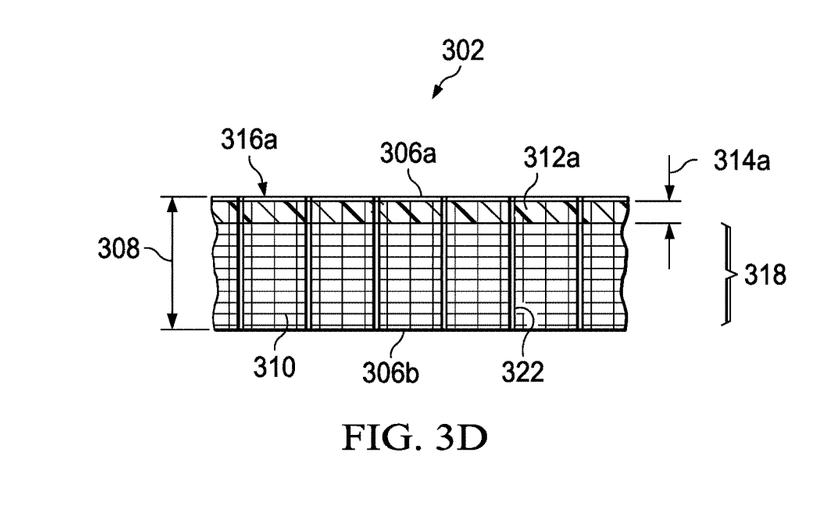

Referring to FIG. 3D, FIG. 3D is a simplified side, cross sectional view of the uncured composite ply 302 of FIG. 3C including perforations 322. The cross-section of FIG. 3D is cut along a line as generally indicated by the lines labeled '3D' in FIG. 3C. Perforations formed for an uncured composite ply (e.g., perforations 322 formed for uncured composite ply 302) may intersect the evacuation channel(s) (e.g., evacuation channel(s) 318) for the uncured composite ply to provide for the ability to evacuate volatiles using both through-the-thickness breathing and edge bleeding during debulking/compaction of an in-process composite structure.

As discussed herein, perforations may be provided to extend through an overall thickness of an uncured composite ply (e.g., as shown for perforations 322 of the uncured composite ply 302 of the embodiment of FIG. 3D) in some embodiments; however, in other embodiments, perforations may extend only through a portion of the overall thickness of an uncured composite ply. For example, in some embodiments, perforations may be provided for both sides of an uncured composite ply and may extend partially into the thickness of the ply to a suitable depth such that the perforations for each side intersect the evacuation channel(s) of the ply but do not extend through the overall thickness of the ply.

Figure 3E:
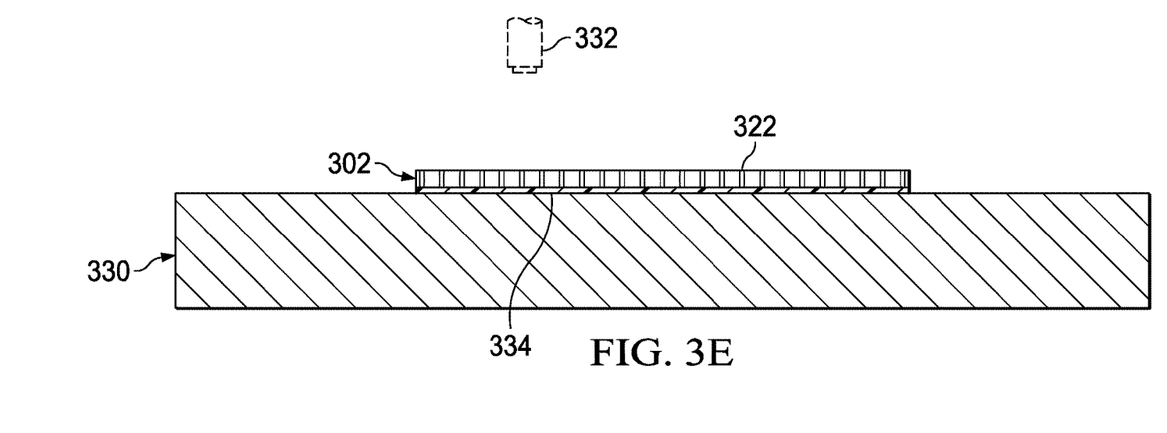
Figure 3F:
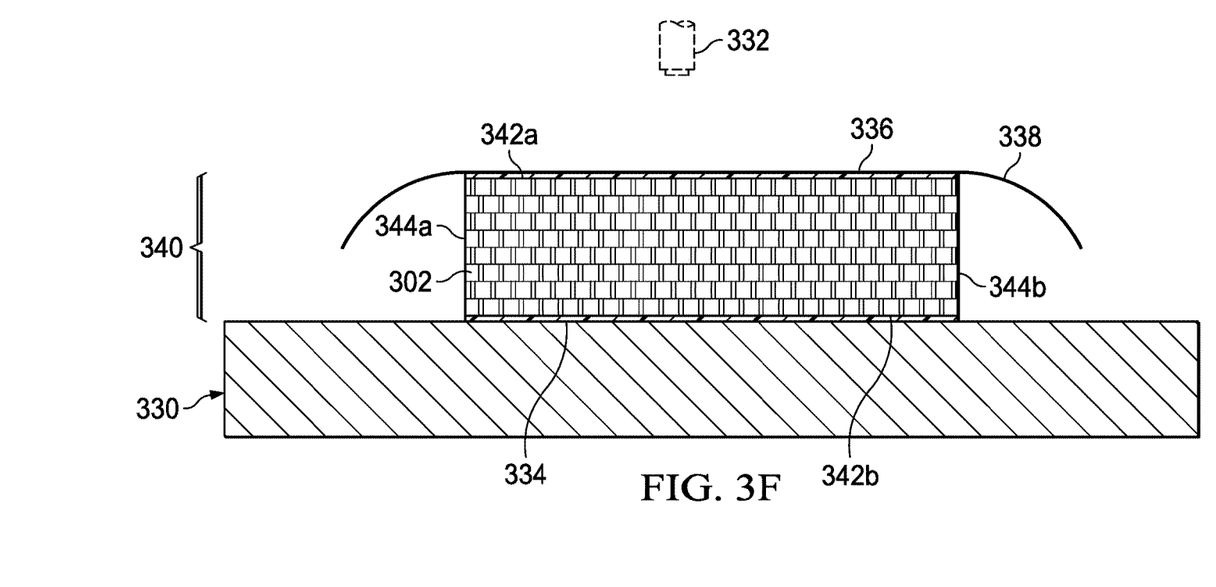

Referring to FIG. 3E, the first backing layer 316a may be removed from the first side 306a of the uncured composite ply 302 including perforations 322 and the first side 306a of the uncured composite ply 302 may be laid-up against a tool 330 to begin to form a ply stack 340 (as shown in FIG. 3F) on the tool 330 in accordance with at least one embodiment.

In various embodiments, the uncured composite ply 302 may be laid-up against the tool by hand or placement machine 332. In some embodiments, the side of the first uncured composite ply that is laid-up on a tool may represent the bottom of the ply stack that is to be formed on the tool. In some embodiments, a first intermediate releasable material, such as a first peel ply or non-perforated release film 334, may be provided between the tool 330 and a first ply laid-up on the tool 330. In some embodiments, the tool 330 may be treated with a release coating.

Referring to FIG. 3F, the ply stack 340 may be assembled (e.g., by hand or via placement machine 332) on the tool 330. The ply stack 340 may include multiple uncured composite plies 302 in which one or more uncured composite ply 302 includes perforations 322 provided therein (e.g., by repeating the needling on one or more uncured ply to form the perforations, as discussed for FIG. 3C). In at least one embodiment, a perforated uncured composite ply 302 of the ply stack 340 may be laid-up against a subsequent ply 302 via the side through which perforations 322 were formed for the ply. For the embodiment of FIGS. 3F-3I, it is assumed that all uncured composite plies 302 of ply stack 340 are perforated; however, it is to be understood that any number of one or more uncured composite plies of a ply stack may be perforated, in accordance with embodiments described herein.

The ply stack 340 may have a top side 342a, a bottom side 342b, and edge sides 344 including a first edge side 344a and a second edge side 344b. It is to be understood that the ply stack 340 can include other edge sides, which are not labeled in FIG. 3F for sake of brevity. In some embodiments, a second intermediate releasable material 336 (e.g., a second peel ply 336) may be provided over the top side 342a of the ply stack 340 for embodiments in which the top side 342a may represent an outer surface of the composite structure that is to be formed; however, in other embodiments no additional intermediate releasable material may be provided on the top side 342a. For example, if composite structure 390 that is to be formed is designed to include more than a certain number of plies (e.g., 14) additional ply stacks may be assembled and debulked/compacted on ply stack 340 to form the composite structure. In some embodiments, releasable materials may also be provided one or more edge side(s) 344 of the ply stack 340. The ply stack 340 may have an overall thickness (not labeled) based on the thickness 308 of each perforated uncured composite ply 302. In at least one embodiment, a foreign material layer such as a release film 338, which may be perforated, may be provided over the top side 342a of the ply stack 340. In at least one embodiment, another release film may, which may be perforated or non-perforated, may be provided on the bottom side 342b of the ply stack 340.

Figure 3G:
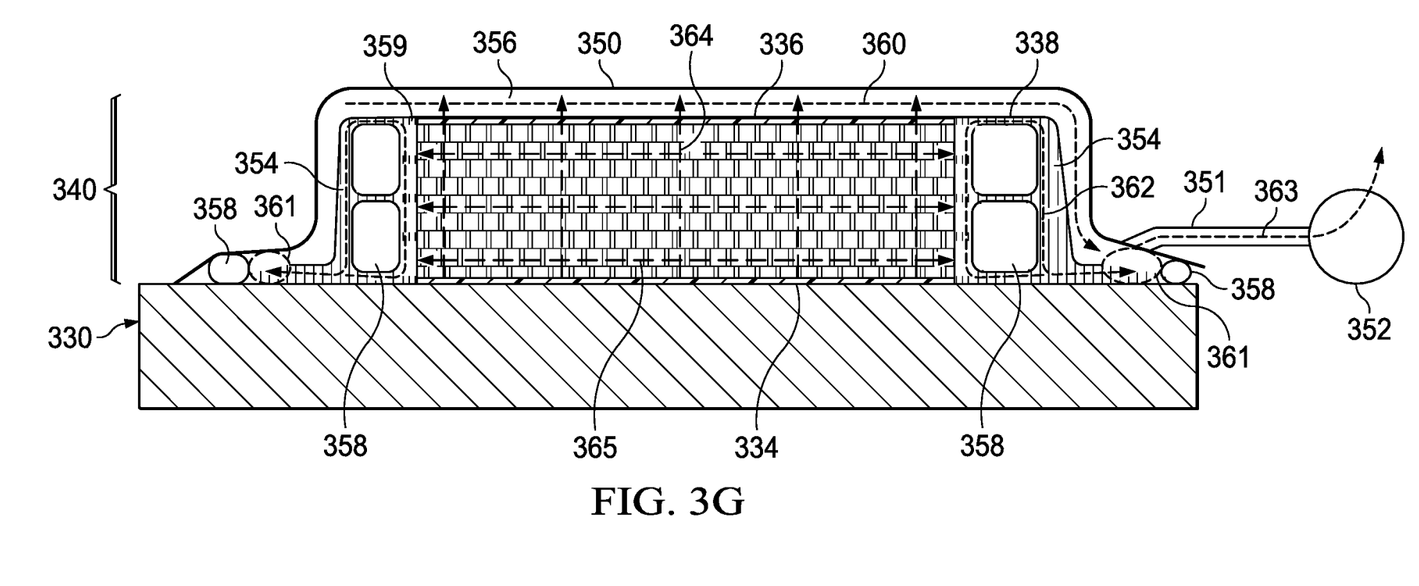

For the embodiment of FIGS. 3F-3G, eight (8) uncured composite plies 302 are illustrated for the assembled ply stack 340; however, the shape and configuration of example ply stack 340 and tool 330 as well as the number of plies 302 of the example ply stack 340 illustrated for FIGS. 3F-3G are provided for illustrative purpose only and are not meant to limit the broad scope of the present disclosure. In at least one embodiment, the ply stack 340 may include up to 14 uncured composite plies in which each uncured composite ply includes perforations for one or more area(s) of each ply (e.g., the overall area or specific area(s)) and may have any shape or configuration. It is to be understood that virtually any shape and/or configuration of a ply stack and/or tool on which the ply stack is formed and/or any number of plies of a ply stack may be envisioned and, thus, are clearly within the scope of the present disclosure.

Referring to FIG. 3G, additional foreign material layers may be positioned around the ply stack 340. For example, a bleeder material 354 may be positioned along the edge sides 344a, 344b of the ply stack 340 and a breather material 356 may be positioned over the release film 338 on top side 342a of the ply stack 340. In some embodiments, the bleeder material 354 may be wrapped-around or otherwise held in place along the edge sides 344a, 344b of the ply stack 340 using bag sealing compound 358. In some embodiments, multiple portions of sealing bag compound 358 can be wrapped in bleeder material 354 and stacked, depending on the overall height of a ply stack. In some embodiments, one or more layers of roving material 359 may be placed between one or more side(s) of the ply stack (e.g., as shown for side 344a in FIG. 3G) and the bleeder material 354; however, in other embodiments, no roving material may be used (e.g., as shown for side 344b in FIG. 3G). In some embodiments, a caul (not shown) may be used along the top side 342a of ply stack 340. If a caul is used, it may be sandwiched between breather material 356 along the top side 342a of the ply stack 340. The ply stack 340 and the foreign material layers may be encapsulated by a sealing bag 350, which may be coupled to a vacuum device 352 using a hose 351 coupled to a port (not shown) of the sealing bag 350 or other appropriate means for coupling the vacuum device 352 to the sealing bag 350. The sealing bag 350 may provide a sealed volume that includes the ply stack 340 in which a vacuum can be drawn on the ply stack 340 using the vacuum device 352. In some embodiments, the sealing bag 350 can be affixed to the tool 330 proximate to the edge sides of the ply stack 340 using bag sealing compound 358; however, in other embodiments, the fully encapsulate the ply stack 340 and the tool 330. In some embodiments, one or more heating devices (e.g., heating pads, etc.) and/or one or more thermocouple(s) or other temperature sensitive device (s) (not shown) may be included inside the sealing bag 350 to apply temperature and/or measure temperature within the sealing bag 350.

The bleeder material 354 and the breather material 356 may be positioned to extend laterally outward from the edge sides 344a, 344b of the ply stack 340 and downward to rest on the tool 330. The breather material 354 may provide a first vent path (as generally indicated by dashed-line arrows 360) for volatiles to be evacuated (as generally indicated by dashed-line arrow 363) from the ply stack via vacuum device 352 using through-the-thickness breathing (as generally indicated by arrows 364) that may be facilitated via the perforations 322 provided for each ply 302 of the ply stack 340. The release film 338 may be between at least a portion of the bleeder material 354 and the breather material 356 but may also allow other portions of the bleeder material 354 and the breather material 356 to touch (as shown by the dashed-line circles 361), which may provide a second vent path (generally indicated by dashed lines 362) for volatiles to be evacuated (363) from the ply stack using edge bleeding (as generally indicated by arrows 365) that may be facilitated via the evacuation channel(s) 318 of each ply 302 of the ply stack 340.

In various embodiments, the vacuum device 352 may be a vacuum pump or other similar device capable of providing a vacuum level within the sealing bag 350. In some embodiments, vacuum levels provided by the vacuum device may range between 1 inch of mercury and 28 inches of mercury; however, other vacuum levels can be envisioned.

Figure 3H:
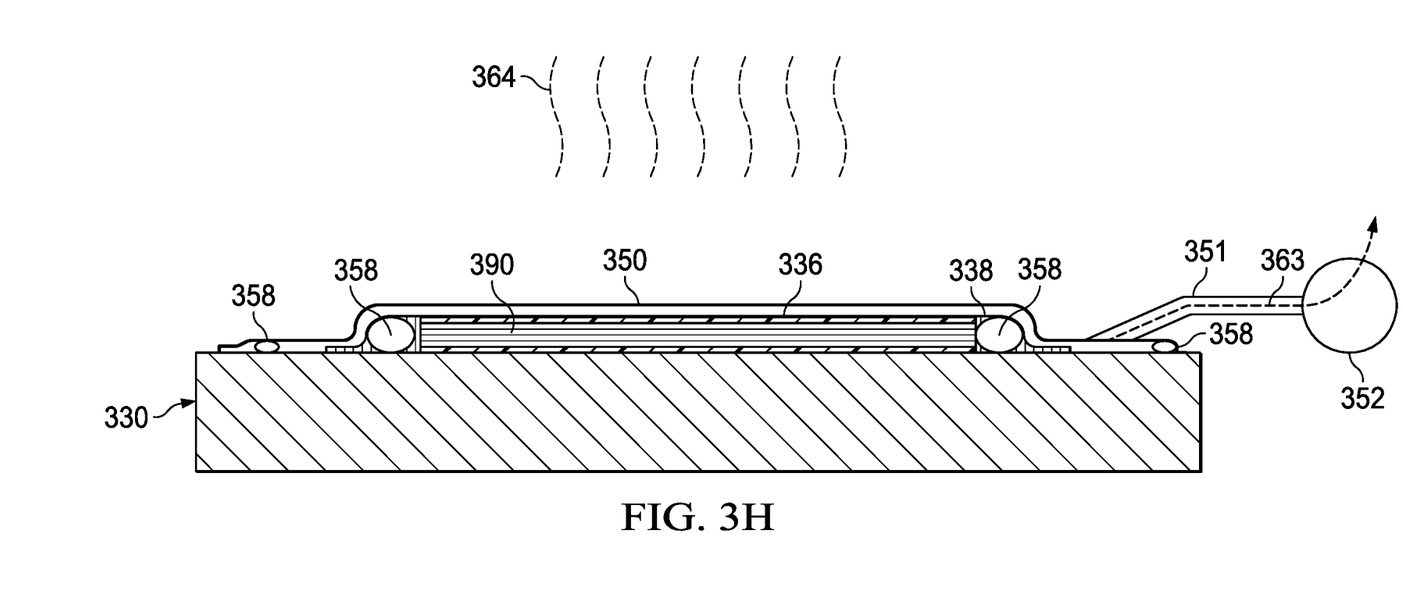

Referring to FIG. 3H, one or more vacuum level(s) may be drawn on the sealing bag 350 using the vacuum device 352 in order to evacuate 363 volatiles from the ply stack 340 using both through-the-thickness breathing (364) provided via the perforations 322 and edge bleeding (365) provided via the evacuation channel(s) 318. The evacuation of volatiles may debulk and compact the ply stack 340 to form composite structure 390. In at least one embodiment, the vacuum level(s) may be drawn at room temperature and may be maintained for one or more suitable period(s) of time, which may vary depending on the design of the composite structure (e.g., size, number of plies, type of plies, etc.). In some embodiments, the ply stack 340 may be heated (as generally illustrated by dashed-squiggle lines 364) to one or more elevated temperature(s) following the room temperature debulking/compaction. In some embodiments, the temperature of the ply stack may be increased gradually over period(s) of time using an oven or autoclave until the desired temperature(s) may be reached.

In some embodiments following the room temperature debulking/compaction (and any optional heated debulking/compaction), additional ply stacks may be assembled and debulked/compacted on the composite structure 390 using similar methods as those described for FIGS. 3A-3H (e.g., the sealing bag would be removed, additional plies could be perforated and laid-up on the composite structure, the laid-up plies could be debulked/compacted via another sealing bag vacuum, etc.); however, in other embodiments the composite structure 390 may be cured if a suitable number plies have been debulked/compacted for the composite structure. Curing is not is not illustrated but could be performed in a similar manner as the debulking/compaction as shown in FIG. 3H. In various embodiments, curing may include maintaining the composite structure under vacuum pressure(s), with heat, without heat, or any combinations thereof for one or more suitable period(s) of time to cure the composite structure 390.

Figure 3I:
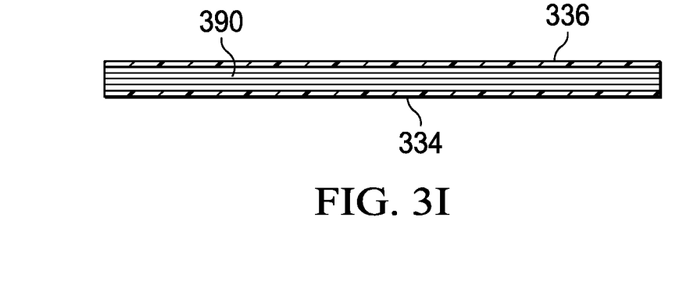

Referring to FIG. 3I, once the composite structure 390 is cured, the sealing bag 350, hose 351, vacuum device 352, certain foreign material layers, and mold tool 330 may be removed and the composite structure 390, which may include the first peel ply 334 and the second peel ply 336 affixed thereto, may be further machined based on the design of the composite structure. The composite structure 390 formed using methods illustrated for the embodiments of FIGS. 3A-3I may have less porosity and improved quality (e.g., improved strength, improved rigidity, etc.) as compared to a composite structure formed without perforations provided for each ply of the composite structure.

Figure 4:
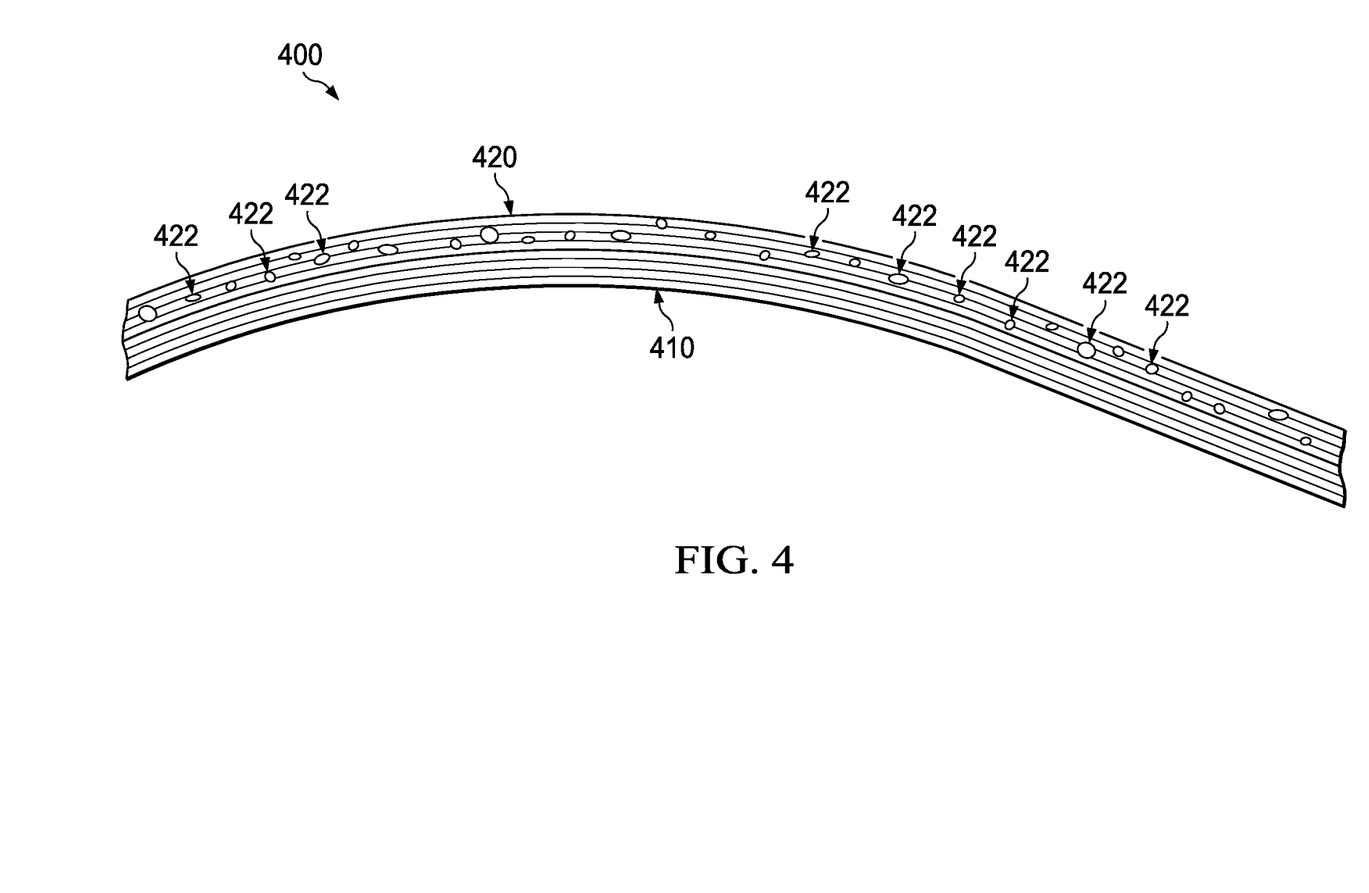
FIG. 4 is a simplified cross-sectional, side view diagram illustrating example comparisons between two example composite structures.

Referring to FIG. 4, FIG. 4 is a simplified cross-sectional, side view diagram 400 illustrating cross-sectional views of two example composite structures including a first example composite structure 410 and a second example composite structure 420. For the embodiment of FIG. 4, perforations were provided through the overall thickness and the overall lateral area for each ply used to form first example composite structure 410. In contrast, no perforations were provided for any ply used to form the second example composite structure 420. A visual, non-magnified cross-sectional comparison between the first example composite structure 410 and the second example composite structure 420 illustrates that the second example composite structure 420 includes significant porosity 422 as compared the first example composite structure 410 in which no porosity is visible. Thus, the first example composite structure 410 is a higher quality composite structure compared to the second example composite structure 420.

The flowcharts and diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of', 'one or more of', and the like can be represented using the '(s)' nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    forming a ply stack comprising a plurality of uncured composite plies, wherein one or more uncured composite ply of the plurality of uncured composite plies comprises a plurality of perforations that extend, at least partially, through a thickness of the one or more uncured composite ply; and
    compacting the ply stack to form a composite structure comprising a planar portion and a non-planar portion, wherein the non-planar portion comprises at least one of a curved portion and an angled portion;
    wherein none of the plurality of perforations is provided in portions of the one or more uncured composite ply corresponding to the linear portion of the composite structure.

2. The method of claim 1, wherein compacting the ply stack further comprises:
    encapsulating the ply stack within a bag; and
    increasing a vacuum level within the bag to increase external pressure on the bag and the composite structure.

3. The method of claim 1, wherein the plurality of perforations provide paths for volatiles to be removed through the thickness of the one or more uncured composite ply of the ply stack during the compacting.

4. The method of claim 1, wherein each of the perforations is provided through the one or more uncured composite ply such that it forms a non-right angle with a top surface of the one or more uncured composite ply.

5. The method of claim 1, wherein the ply stack comprises at least 14 uncured composite plies.

6. The method of claim 1, wherein the plurality of perforations are provided for an overall area of at least one uncured composite ply of the plurality of uncured composite plies.

7. The method of claim 1, wherein the plurality of perforations for at least one of the uncured composite plies extend completely through the thickness of the least one of the uncured composite plies.

8. The method of claim 1, wherein at least one perforation of the plurality of perforations for a particular one of the uncured composite plies intersects at least one evacuation channel for the particular uncured composite ply.

9. The method of claim 1, wherein compacting the ply stack further comprises:

providing a bleeder material along sides of the ply stack, wherein the bleeder material extends laterally away from the sides of the ply stack;

providing a perforated release film over the ply stack, wherein the perforated release film extends laterally away from the sides of the ply stack;

providing a breather material over the perforated release film, wherein the breather material extends laterally away from the sides of the ply stack, and the release film is between at least a portion of the breather material and the bleeder material;

encapsulating the ply stack, the bleeder material, the perforated release film, and the breather material within a bag; and increasing a vacuum level within the bag to increase external pressure on the bag and the composite structure.

10. The method of claim 9, wherein compacting the ply stack further comprises:

providing roving material between the bleeder material and at least one of the sides of the ply stack.

11. The method of claim 1, wherein forming the ply stack further comprises:

forming the plurality of perforations for the one or more uncured composite ply of the plurality of uncured composite plies; and assembling the one or more uncured composite ply on a tool to form the ply stack after the plurality of perforations are formed for the one or more uncured composite ply.

12. The method of claim 1, wherein the perforations are formed for a side of the one or more uncured composite ply that has a backing layer.

13. The method of claim 1, wherein forming the ply stack further comprises:

assembling the one or more uncured composite ply on a tool to form the ply stack; and forming the perforations for the assembled one or more uncured composite plies on the tool.

14. The method of claim 13, wherein the forming the ply stack further comprises:

assembling one or more additional uncured composite ply on the ply stack, wherein the one or more additional uncured composite ply does not have a plurality of perforations.

15. The method of claim 14, wherein forming the ply stack further comprises:

forming the perforations for the assembled one or more uncured composite plies on the tool.

16. The method of claim 1, wherein all uncured composite plies of the ply stack comprise the plurality of perforations that extend, at least partially, through the thickness of each uncured composite ply.

17. The method of claim 1, wherein the compacting is performed at room temperature.

18. The method of claim 17, wherein the compacting is performed at one or more elevated temperatures following the room temperature compacting.

19. The method of claim 1, further comprising:

curing the composite structure.

* * * * *